United States Patent Office 3,547,985
Patented Dec. 15, 1970

3,547,985
UNSATURATED SULPHONIC ACID BETAINES
Heinrich Rinkler and Horst Wieden, Dormagen, Hugo Wilms, Leverkusen, and Günther Nischk, Dormagen, Germany, assignors to Farbenfabriken Bayer Aktiengesellschaft, Leverkusen, Germany, a corporation of Germany
No Drawing. Filed Feb. 23, 1966, Ser. No. 529,223
Claims priority, application Germany, Mar. 6, 1965,
F 45,435
Int. Cl. C07c *143/00*
U.S. Cl. 260—501.12      8 Claims

ABSTRACT OF THE DISCLOSURE

Unsaturated sulphonic acid betaines of the general formula:

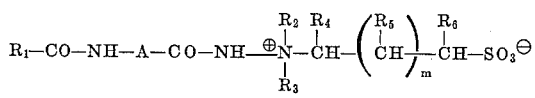

wherein $R_1$ is a member of the group consisting of an alkenyl and an aralkenyl radical, A is an aryl radical, $R_2$ and $R_3$ denote a lower alkyl radical, $R_4$, $R_5$, $R_6$ are members of groups consisting of hydrogen and a lower alkyl radical and $m$ is 1 or 2. These products have antistatic properties and can be admixed with high polymers as antistatic agents. These products are produced by reacting an unsaturated N,N-disubstituted acid hydrazide with a sultone in an organic solvent at a temperature of about 0 to 150° C. in the presence of a polymerisation prohibitor.

This invention relates to new unsaturated sulphonic acid betaines and to a method for their preparation. It is known to react aliphatic sultones with compounds which have a mobile hydrogen atom. The corresponding sulphonic acids are formed in this reaction. Thus, for example, by reacting sultones with carbonamide groups there are formed, depending on the reaction conditions, the corresponding imino esters or N-substitution products with terminal sulphonic acid groups. It is also known that tertiary amines can be alkylated on the nitrogen by means of sultones to form sulphonic acid betaines.

It is an object of this invention to provide new unsaturated sulphonic acid betaines of the formula

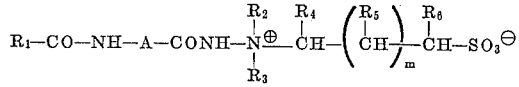

wherein $R_1$ is a member of the group consisting of an alkenyl and an aralkenyl radical, $R_2$ and $R_3$ lower alkyl radicals, A an arylene group $R_4$, $R_5$, $R_6$ hydrogen or a lower alkyl and $m$ an integer 1 or 2.

A further object of the invention is a process for preparing these unsaturated sulphonic acid betaines by reacting unsaturated N,N-disubstituted acid hydrazides of the general formula

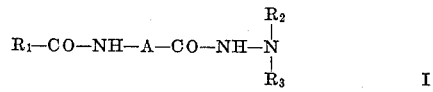

wherein $R_1$ denotes an alkenyl or aralkenyl radical, A an aryl radical and $R_2$ and $R_3$ denote the same or different lower alkyl radicals, with aliphatic sultones of the general formula

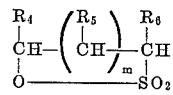

wherein $R_4$, $R_5$ and $R_6$ denote hydrogen or lower alkyl radicals and $m$ is an integer 1 or 2, in an organic solvent at temperature of 0 to 150° C. The reaction may be carried out in the presence of a polymerisation inhibitor.

Suitable starting compounds of Formula I are, for example, the amides of N,N-dialkylated aminoaryl carboxylic acid hydrazides and unsaturated carboxylic acids such as o-, m- and p-acryloyl-amino-benzoic acid-N,N-dimethyl-hydrazide, o-, m- and p-methacryloyl-amino-benzoic acid-N,N-dimethyl-hydrazide, o-, m-, and p-crotonoyl-amino-benzoic acid-N,N-dimethylhydrazide, o-, m- and p-cinnamoyl-amino-benzoic acid-N,N-dimethylhydrazide, o-, m-, and p-crotonoyl-amino-benzoic acid-N-methyl-N-ethyl hydrazide, o-, m- and p-methacryloyl-amino-benzoic acid-N,N-diethylhydrazide, 5-methacryloyl-amino-naphthoic acid (1)-N,N-dimethylhydrazide and 5-methacryloyl-amino-naphthoic acid-(2)-N,N-dimethylhydrazide.

These unsaturated N,N-disubstituted acid hydrazides of the general Formula I may, for example, be obtained by reacting the corresponding amino-aryl-carboxylic acid N,N-dialkylhydrazides with unsaturated acid halides or acid anhydrides. Suitable sultones for the process of the invention are, for example, propanesultone-1,3- and butanesultone-1,4; if desired, the carbon atoms of the methylene chain of this compound may also be substituted, e.g. in butanesultone-1,3.

The process may be carried out in a solvent, in which case it is advantageous to use solvents in which both reactants are adequately soluble and from which the alkylation products are precipitated in crystalline form. Examples of such solvents are aromatic hydrocarbons such as benzene, toluene and xylene, chlorinated hydrocarbons such as methylene chloride, chloroform, carbon tetrachloride and 1,2-dichloropropane, alcohols such as methanol and ethanol and ketones such as acetone, methyl ethyl ketone and diethylketone.

The process according to the invention is carried out at temperatures of 0 to 152° C., preferably 20 to 100° C. The process may be carried out by, for example, dissolving or suspending the starting material of Formula I in one of the above mentioned solvents and slowly adding the sultone, if desired in excess, at the requisite reaction temperature or adding the sultone to the reaction mixture from the start. The corresponding unsaturated sulphonic acid betaines of the general formula:

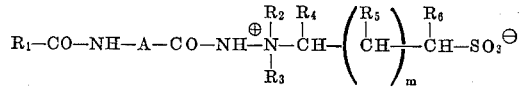

wherein $R_1$ denotes an alkenyl or aralkenyl radical, A an aryl radical, $R_2$ and $R_3$ denote the same or different lower alkyl radicals, $R_4$, $R_5$, $R_6$ represents hydrogen or a lower alkyl radical and $m$ an integer 1 or 2 in most cases precipitate spontaneously in the course of the reaction or on cooling and can be separated by filtration. When very reactive starting products are used, it is advisable to carry out the reaction in the presence of polymerisation inhibitors such as hydroquinone, tertiary butyl pyrocatechol, quinhydrone, phenothiazine, m-dinitrobenzene or copper salts.

It is surprising that the reaction according to the invention leads to uniform monomers. The starting compounds of Formula I contain, in addition to the tertiary nitrogen atom, at least two further nitrogen atoms carrying readily exchangeable hydrogen atoms. It was therefore to be expected that these hydrogen atoms, as mentioned initially, would react with sultones to yield completely undefined products.

The new compounds can be used for the production of pharmaceuticals. In addition, the antistatic properties of high polymers can be greatly improved by incorporating these compounds therein by mixing, calendering or injection molding procedure at higher temperatures. In this way the compounds of the invention are graft-polymerized on the high polymers. Therefore it is not possible to extract the sulfonic acid betaines and the antistatic properties are preserved. For example, every 10 parts by weight of the unsaturated sulfonic acid betaine of the formula

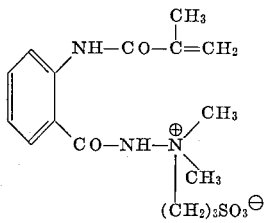

and 10 parts by weight of a polyglycol (trade name Advastat 51) were incorporated by mixing the compounds with 60 parts by weight of polyvinylchloride in a mixing roll at 160 to 170° C. for 30 minutes. 30 parts of dioctylphthalate (plasticizer) were added. From evary material, a foil was prepared (500μ). The two foils were treated for four days with water dried and stored for four days at 20° C. and a relative atmospheric moisture of 65%. The surface resistance was measured before the treatment and after the treatment with water.

TABLE

| Antistatic agent | Before water-treatment, ohm | After water-treatment, ohm |
| --- | --- | --- |
| Sulfonic acid betaine | $8,2 \cdot 10^7$ | $7,3 \cdot 10^8$ |
| Polyglycol | $3,9 \cdot 10^9$ | $7,8 \cdot 10^{10}$ |

EXAMPLE 1

27.6 parts o-methacryloyl-amino-benzoic acid-N,N-dimethyl hydrazide and 0.5 part of tertiary butylpyrocatechol are suspended in 100 parts of acetone. 14.3 parts of propane sultone-1,3- are added dropwise at room temperature and the reaction mixture is heated for 40 to 50 hours at 55 to 60° C.

The resulting sulphonic acid betaine

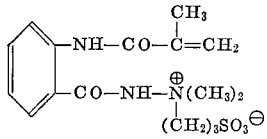

percipitates and can be filtered off. Yield: 33 parts by weight, decomposition point 184° C.

Preparation of starting compound 30 parts of o-amino-benzoic acid-N,N-dimethylhydrazide, 9.5 parts of sodium carbonate and 0.2 part of tertiary butyl pyrocatechol are suspended in 250 parts of methylene chloride. 18 parts of methacryl chloride are added dropwise with vigorous stirring at 0 to 5° C. Stirring is continued for a further 2 to 3 hours at room temperature and the solvent is removed in a water jet vacuum. Yield: 31 parts by weight, freezing point 128° C. from methanol.

EXAMPLE 2

49.4 parts by weight of powdered m-methacryloyl-amino-benzoic acid-N,N-dimethylhydrazide are added at room temperature, with stirring, to a solution of 26.8 parts by weight of propanesultone-1,3 and 0.75 part by weight of phenothiazine in 180 parts by volume of acetone. The reaction mixture is heated for 48 hours at 60° C., the precipitated crystals of sulphobetaine

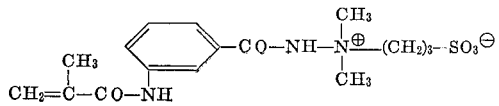

are filtered off with suction and then washed with a small amount of acetone. Yield: 60.5 parts by weight, melting point 184–185° C. from ethanol/water.

Preparation of starting compound 71.6 parts by weight of m-amino-benzoic acid-N,N-dimethylhydrazide are suspended at room temperature, with stirring, in a solution of 0.5 part by weight of phenothiazine in 200 parts by volume of benzene. 80.1 parts by weight of methacrylic acid anhydride are then added to the suspension. After a short time, the temperature of the reaction mixture rises to 50 to 60° C., and a clear solution is formed temporarily. The reaction mixture is kept at 50 to 60° C. for 30 minutes and then left to cool slowly to room temperature. The crystals of m-methacryloyl-amino-benzoic acid-N,N-dimethylhydrazide which separate are filtered off with suction washed with benzene and recrystallised from ethanol. Yield: 82 to 85% of the theoretical. Melting point 142 to 143° C. from ethanol.

EXAMPLE 3

49.4 parts by weight of powdered p-methacryloyl-amino-benzoic acid-N,N-dimethylhydrazide are added at room temperature, with stirring, to a solution of 26.8 parts by weight of propanesultone-1,3 and 0.4 part by weight of phenothiazine in 200 parts by volume of acetone. The reaction mixture is heated for 20 hours at 60° C., the precipitated crystals of corresponding sulphobetaine are filtered off with suction and washed with acetone. Yield: 66.5 parts by weight. Melting point 230–232° C. from ethanol/water.

The preparation of the starting compound is carried out by the method given in Example 2. Yield: 89% of the theoretical, melting point 156–158° C. from ethyl acetate.

EXAMPLE 4

15 parts of o-crotonoyl-aminobenzoic acid-N,N-dimethylhydrazide, 10 parts of propanesultone-1,3 and 0.5 part of tertiary butylpyrocatechol are suspended in 100 parts of acetone and heated for 40 to 50 hours at 55 to 60° C. The resulting sulphonic acid betaine

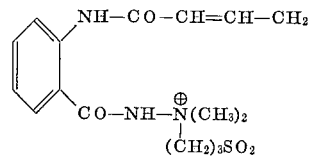

precipitates in the form of crystals and can be filtered off. Yield: 16.6 parts, decomposition point 215° C.

Preparation of starting compound 50 parts of o-amino-benzoic acid-N,N-dimethylhydrazide, 0.5 part of tertiary butyl pyrocatechol and 47 parts of crotonic acid anhydride are heated in 400 parts of benzene at 60 to 70° C. for 1 to 2 hours. The reaction product, which is at first oily, is washed with water and crystallises after a short time. Yield: 47.5 parts, solidification point 128 to 130° C. from ethanol.

EXAMPLE 5

12.35 parts by weight of m-crotonoyl-amino-benzoic acid-N,N-dimethylhydrazide are added at room temperature, with stirring, to a solution of 7 parts by weight of propanesultone-1,3- and 0.19 part by weight of phenothiazine in 70 parts by volume of acetone. The reaction mixture is heated for 35 to 40 hours at 60° C. the precipitated crystals of the corresponding sulphobetaine are filtered off with suction and washed with acetone. Yield: 13 parts by weight, melting point 223 to 226° C. from ethanol/water.

The starting compound is prepared by the method given in Example 4. Yield: 84% of the theoretical, melting point 187° C. from ethanol.

EXAMPLE 6

9.84 parts by weight of p-crotonoyl-aminobenzoic acid-N,N-dimethylhydrazide are added at room temperature, with stirring, to a solution of 6 parts by weight of propane-sultone-1,3- and 0.16 part by weight of phenothiazine in 70 parts by volume of diethylketone. The reaction mixture is heated for 20 to 25 hours at 80° C., the crystals of the sulphobetaine

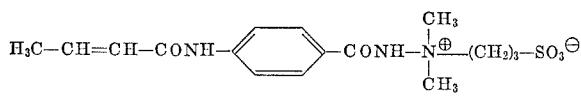

which precipitate are filtered off with suction and washed with acetone. Yield: 13.2 parts by weight, decomposition point 245 to 248° C. from ethanol/water.

The starting compound is prepared by the method given in Example 4. Yield: 95% of the theoretical. Melting point 210° C. from ethanol.

What we claim is:

1. Unsaturated sulphonic acid betaines of the general formula

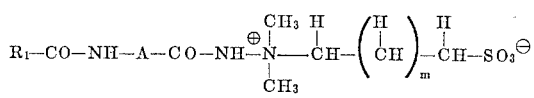

wherein $R_1$ is a member of the group consisting of propenyl and isopropenyl, A is phenylene and $m$ is 1.

2.

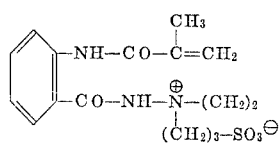

3.

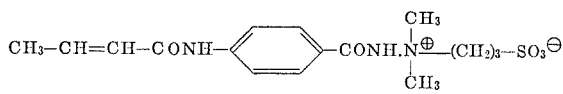

4.

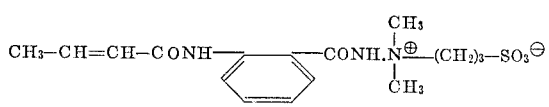

5. A process for the preparation of unsaturated sulphonic acid betaines, which comprises reacting an unsaturated N,N-disubstituted acid hydrazide of the general formula

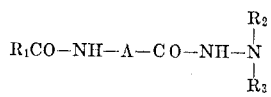

wherein $R_1$ is a member of the group consisting of ethenyl, propenyl, isopropenyl and styryl, A is a member selected from the group consisting of phenylene and naphthylene and $R_2$ and $R_3$ denote a member selected from the group consisting of methyl and ethyl with a sultone of the general formula

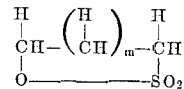

wherein $m$ is 1 or 2, said reaction being carried out in an organic solvent at temperature of 0 to 150° C., in the presence of a polymerization inhibitor.

6. The process of claim 5, wherein said organic solvent is a ketone.

7. The process of claim 5, wherein said organic solvent is an aromatic hydrocarbon.

8. The process of claim 5 wherein said polymerisation inhibitor is tertiary butylpyrocatechol.

References Cited

UNITED STATES PATENTS

| 2,777,872 | 1/1957 | Shacklett | 260—501.13 |
| 3,113,026 | 12/1963 | Sprung | 260—501.12 |

FOREIGN PATENTS

| 1,018,421 | 10/1957 | Germany | 260—501.12 |
| 764,340 | 12/1956 | Great Britain | 260—501.12 |

LEON ZITVER, Primary Examiner

M. W. GLYNN, Assistant Examiner

U.S. Cl. X.R.

260—558, 92.8, 884

UNITED STATES PATENT OFFICE
CERTIFICATE OF CORRECTION

Patent No. 3547985      Dated December 15, 1970

Inventor(s) Heinrich Rinkler et al

It is certified that error appears in the above-identified patent and that said Letters Patent are hereby corrected as shown below:

Col. 3, line 23    (Spec. p. 5, 5th line after formula)

"evary" should be --every--

Col. 4, Example 4 formula (Spec. p. 8

" 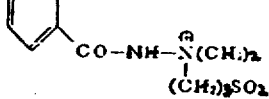 " should be -- 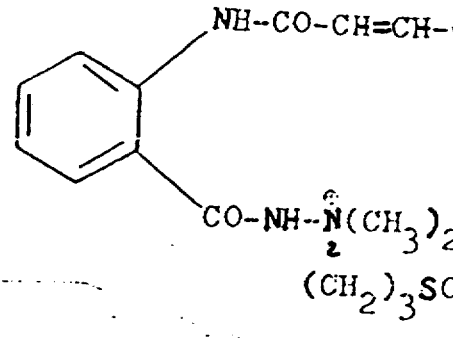

Signed and sealed this 6th day of April 1971.

(SEAL)
Attest:

EDWARD M. FLETCHER, JR.
Attesting Officer

WILLIAM E. SCHUYLER,
Commissioner of Patents